P. ARRIGHI.
ROTARY ENGINE.
APPLICATION FILED OCT. 16, 1919.
1,353,374.
Patented Sept. 21, 1920.
4 SHEETS—SHEET 1.
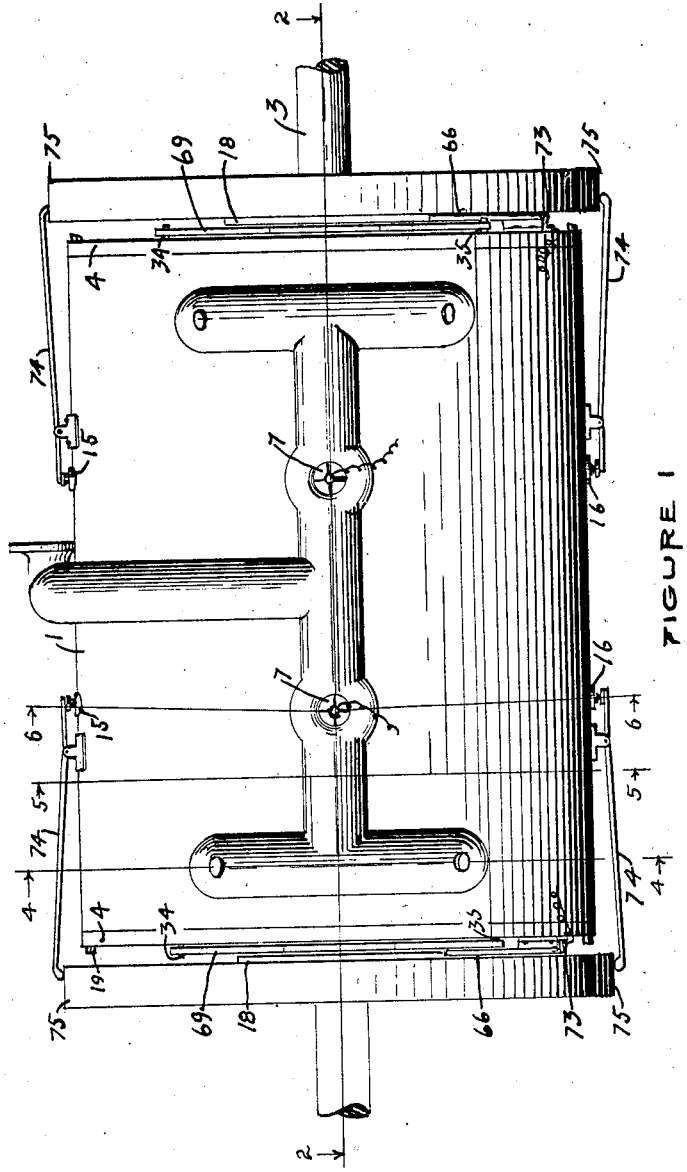
INVENTOR
Pietro Arrighi
BY John A. Naismith
HIS ATTORNEY

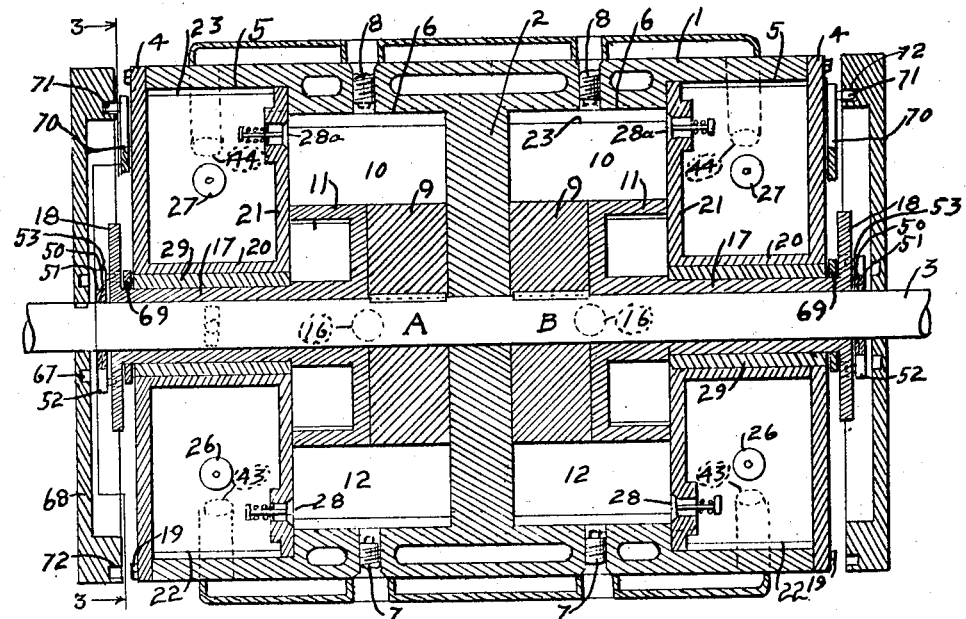
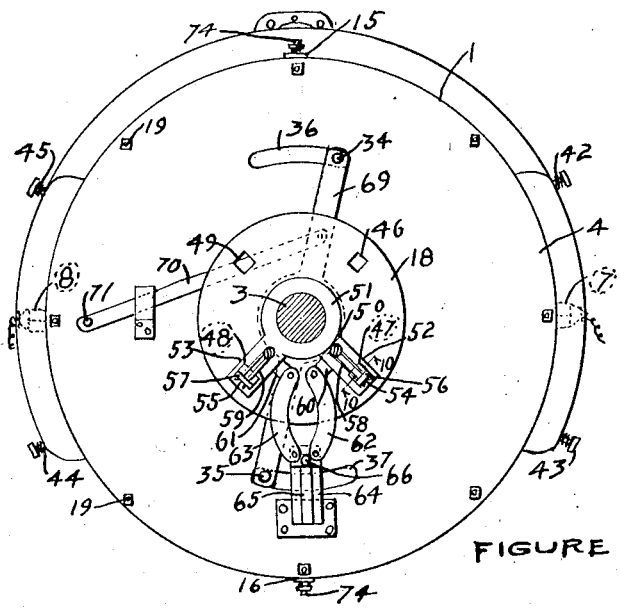
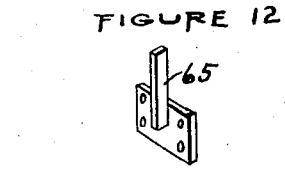
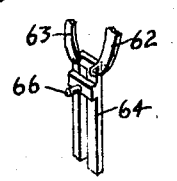

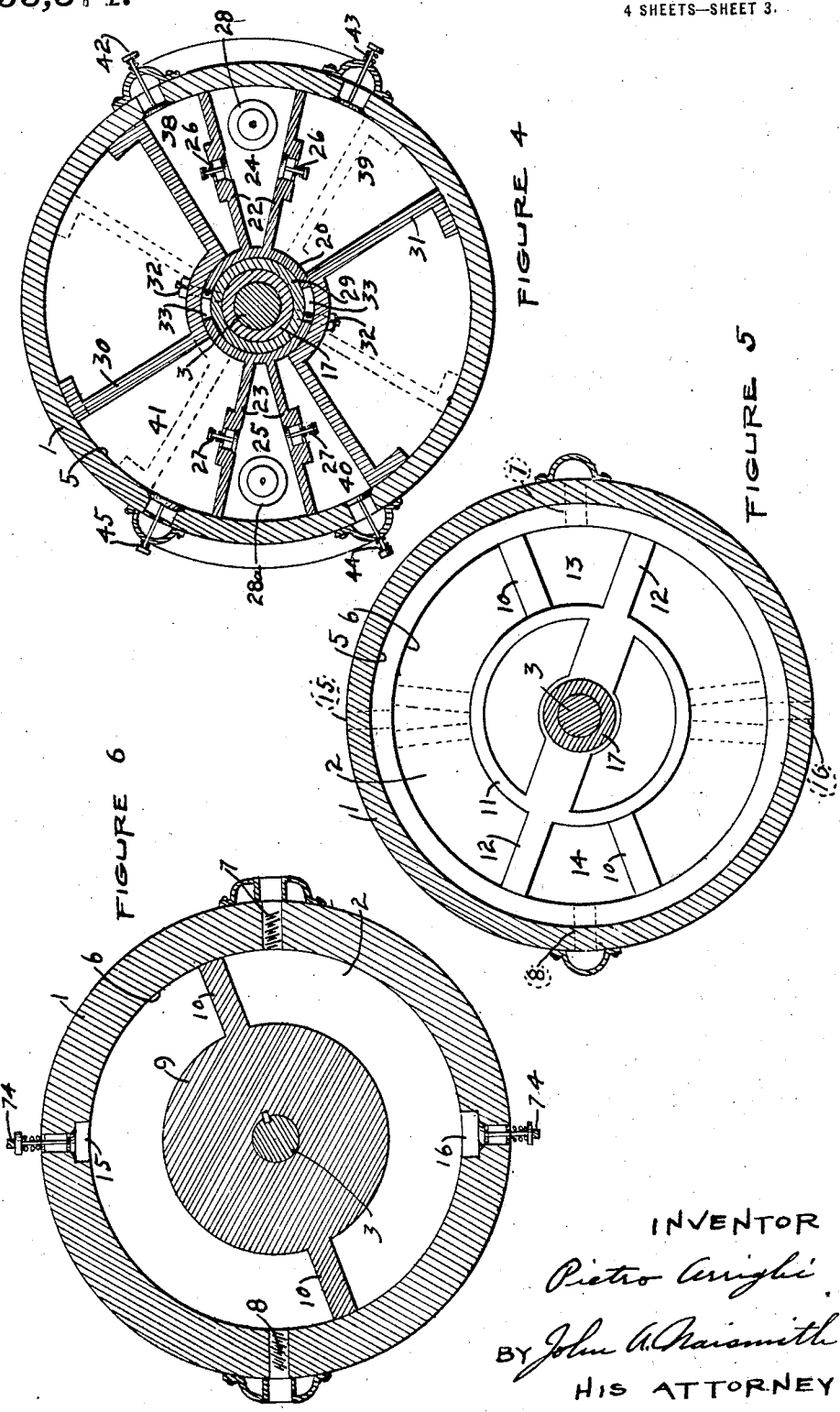

P. ARRIGHI.
ROTARY ENGINE.
APPLICATION FILED OCT. 16, 1919.

1,353,374.

Patented Sept. 21, 1920.
4 SHEETS—SHEET 4.

INVENTOR
Pietro Arrighi
BY John A. Naismith
HIS ATTORNEY

UNITED STATES PATENT OFFICE.

PIETRO ARRIGHI, OF SAN FRANCISCO, CALIFORNIA.

ROTARY ENGINE.

1,353,374.  Specification of Letters Patent.  Patented Sept. 21, 1920.

Application filed October 16, 1919. Serial No. 331,101.

*To all whom it may concern:*

Be it known that I, PIETRO ARRIGHI, a subject of the King of Italy, and resident of San Francisco, in the county of San Francisco and State of California, have invented certain new and useful Improvements in Rotary Engines, of which the following is a specification.

My invention relates to rotary internal combustion engines, and the object of my invention is to provide an engine of the character indicated that will be simple in form, construction and operation, and highly efficient in its practical application.

In the drawings:—

Figure 1 is a side elevation of my improved engine.

Fig. 2 is a sectional view on 2—2 of Fig. 1.
Fig. 3 is a sectional view on 3—3 of Fig. 2.
Fig. 4 is a sectional view on 4—4 of Fig. 1.
Fig. 5 is a sectional view on 5—5 of Fig. 1.
Fig. 6 is a sectional view on 6—6 of Fig. 1.

Fig. 10 is a sectional view on 10—10 of Fig. 3.

Figs. 12–13 are perspective views of the guide and slotted elements used in the operation of the member shown in Fig. 8.

Figure 7:
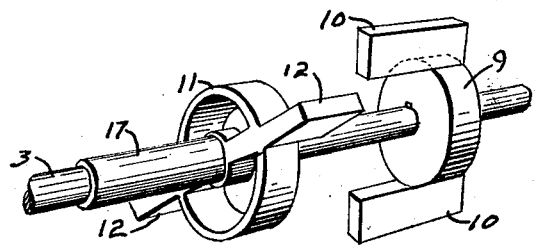
Fig. 7 is a reduced perspective view of the two revolving members which form part of the combustion chambers but separated on the shaft to show their forms more clearly.
Figure 8:
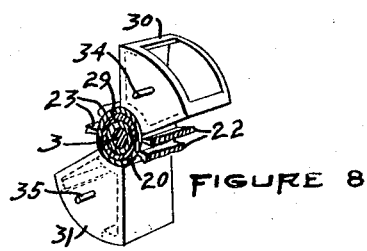
Fig. 8 is a perspective view of the fuel induction member.
Figure 9:
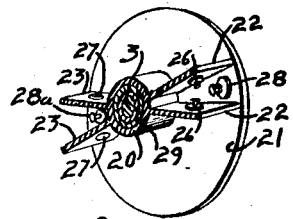
Fig. 9 is a perspective view of the fuel induction chamber, part being broken away.

In the drawing 1 indicates a cylindrical engine body having a central division 2 through which passes shaft 3. The construction of the engine upon the two sides of division 2 is identical, therefore similar reference characters will be placed upon both sections to indicate similar parts and the two sections are lettered "A" and "B" respectively. Each section is closed with a head 4 and is provided with two cylindrical and concentric chambers as 5 and 6, the latter being of less diameter than the former and having spark plugs 7 and 8 operatively mounted therein upon opposite sides thereof. Keyed to shaft 3, in chamber 6, is a circular member 9 of less diameter than said chamber but carrying a pair of oppositely arranged blades 10 extending to the inner perimeter of the chamber and also laterally to the two side walls thereof, the members 9 and 10 being suitably formed to rotate in said chamber without permitting the passage of gas between them and the chamber walls.

At 11 is shown a second rotating member carrying oppositely positioned blades 12 of similar size and form to blades 10 and coöperating therewith to form, with the walls of the chamber 6, explosion chambers 13 and 14 respectively, exhaust ports as 15 and 16 being positioned in body 1 at right angles to the spark plugs 7 and 8. Member 11 rotates freely on shaft 3 and carries a sleeve 17 to which is attached a plate 18 positioned on the outside of body 1 and for the purpose hereinafter described.

Head 4 is secured to body 1 by bolts 19 and is provided with an inwardly extending sleeve 20 and an inner parallelly arranged plate 21 which, when in position, forms a closure for chamber 6 and consequently for explosion chambers 13 and 14. These two members 4 and 21, and sleeve 20, are joined by radiating webs 22 and 23 forming, respectively, compression chambers 24 and 25 and provided with spring controlled valves 26—26 and 27—27 opening therein. Each compression chamber 24 and 25 communicates with its respective explosion chamber by means of a spring controlled valve as 28 and 28ª respectively positioned in plate 21 and opening into chamber 6.

Rotatably mounted within sleeve 20 and upon sleeve 17 is a sleeve 29. Bolted to sleeve 29 and upon opposite sides thereof are segmental sections 30 and 31, the bolts 32 passing through slots 33 formed in fixed sleeve 20. Sections 30 and 31 are hollow as shown and necessarily reciprocate as a unit, each segment being provided with a pin as 34 and 35 extending out through slots 36 and 37 in plate 4 and forming, in conjunction with plates 4 and 21 and webs 22—22 and 23—23, the several suction chambers 38—39—40 and 41. Each of these suction chambers is provided with an inlet valve as 42—43—44 and 45 respectively connected to a suitable source of fuel supply not shown.

Member 11 with its blades 12 is rotated mechanically at fixed periods in the following manner. The disk 18 to which it is connected by sleeve 17 is provided with four rectangular orifices 46—47—48 and 49 in the relative positions shown. Mounted on shaft 3 adjacent disk 18 are a pair of rings 50 and 51 each ring carrying an arm as 52 and 53 respectively, provided with rectangular openings 54 and 55. In these openings are positioned catches 56 and 57, held in position by springs 58 and 59. On each arm 52—53 is a smaller arm as at 60—61 having curved links 62 and 63 pivotally connected thereto, these links being in turn pivotally connected to a bar 64 mounted to slide vertically on guide 65 and carrying a pin 66 on its outer surface. Pin 66 operates in a groove 67 in a plate 68 keyed to shaft 3. Catches 56—57 are arranged to work in opposite directions so that as shaft 3 revolves and member 64 is forced upwardly by groove 67 and pin 66, catch 56 engages one of the openings as 44 and gives disk 18 a one quarter turn. Upon the downward movement of member 64 the other catch 57 engages an opening in plate 18 as 49 and gives the disk another quarter turn, this mechanism giving disk 18, sleeve 17 and members 11 and 12 four quarter turns during each revolution of the shaft 3.

Segmental sections 30 and 31 are reciprocated in chamber 5 and between fixed webs 22 and 23 in the following manner. At 69 is a bar engaging both pins 34 and 35 and rotatably mounted on sleeve 17. At 70 is shown a link pivotally connected to bar 69 and provided with a pin 71 operating in slot 72 formed in plate 68 so that segments 30 and 31 are moved one full cycle during each revolution of shaft 3.

The spark plugs 7 and 8 are placed in an electrical circuit not shown with a contact at 73 whereby explosions are caused simultaneously in chambers 13 and 14 at each half revolution of shaft 3.

The several mechanisms hereinbefore described are so arranged and coördinated as to function in the following manner, assuming that an explosion has just occurred in chambers 13 and 14 and members 10 are revolving with shaft 3 in the direction indicated by the arrow. The revolution of shaft 3 through the medium of parts 17, 18 and 46 to 68 inclusive throws members 12 around into the position indicated in dotted lines at 12ᵇ at the time when members 10 have just passed exhaust ports 15 and 16 thereby discharging all of the burnt gases out through said ports. This mechanism again operates to throw said members another quarter turn around after the exhaust has taken place and at the proper moment to reform chambers 13 and 14 preparatory for the next explosions.

Figure 11:
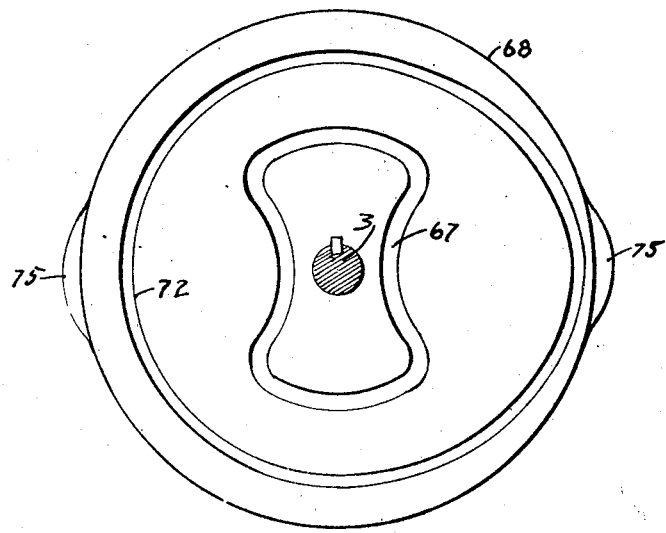
Fig. 11 is an interior view of the end cam plate.

The action of an explosion on parts 11 and 12 and parts connected thereto is as follows. Assuming the groove 67 to be in the position shown in Fig. 11 and catch 56 to be in engagement with the orifice 47 as shown at the time an explosion occurs. The power generated by the explosion is expended in causing blades 10—10, member 9, shaft 3 and plate 68 to revolve, but blades 12—12, member 11, sleeve 17 and plate 18 remain stationary for a moment since they are locked against turning backward by catch 56. The parts carrying catch 56, including link 62, exert an outward pressure upon pin 66 thereby causing it to engage more tightly the outer wall of groove 67 but not materially interfering with the rotation of plate 68, the revolution of which immediately causes catch 56 to advance plate 18 a quarter of a revolution, the catch returning to the first position before the next explosion occurs. If the explosion occurs when catch 57 is engaging orifice 49 at the close of the upward movement of catch 56, then the same effect is secured except that pin 66 is pressed against the inner wall of groove 67.

As members 10 are moved forward to exhaust as described the full and proper amount of mixture for the next charge is supplied by means of sections 30 and 31 which induct the mixture through valves 42—43—44—45 when moving in one direction and force the same through valves 26—27 into chambers 24 and 25 and thence through valves 27—28 when moving in the opposite direction. There is an induction and discharge of mixture into one of the chambers 24 or 25 at each movement of sections 31—32 and it is timed so as to discharge the full amount of mixture required into chambers 13—14 just as members 12 begin to approach members 10 in forming said chambers thereby compressing said charge.

Since the fresh charge is forced into chambers 13—14 while they are still in communication with the exhaust ports the exhaust valves are mechanically opened for the brief period necessary by means of levers 74 operated by cam surfaces 75 on plate 68.

The two portions A and B of the engine may be so arranged as to operate simultaneously, or one portion may be operated at any desired period in advance of the other if so desired. Chamber 5 is herein referred to as the primary chamber and chamber 6 as the secondary chamber. It is understood of course that changes in form, construction and details of operation may be made within the scope of the appended claims.

I claim:

1. A rotary engine including a casing having circular, axially alined and independent primary and secondary chambers formed therein, a shaft axially and revolubly mounted in said chambers, devices operatively mounted on said shaft for compressing and exploding fuel gas in said secondary chamber and for expelling burnt gases therefrom, and devices for inducting fuel gas into said primary chamber and compressing the same therein, and for permitting the passage of said compressed gas from said primary chamber to said secondary chamber at predetermined periods.

2. A rotary engine including a casing having circular axially alined and independent primary and secondary chambers formed therein, a shaft axially and revolubly mounted in said chambers, a member fixedly secured to said shaft and a shaft actuated member operatively mounted in said secondary chamber to coöperate in compressing fuel gas therebetween and in exhausting the burnt gases from said chamber, fixed valve controlled compression chambers in said primary chamber, and a shaft oscillated member operatively mounted to induct fuel gas into said primary chamber and compress the same in said compression chambers, and means for permitting the passage of said compressed gas into said secondary chamber at predetermined periods.

3. A rotary engine including a casing having circular, axially alined and independent primary and secondary chambers formed therein, a shaft axially and revolubly mounted in said chambers, a member fixedly secured to said shaft and a shaft actuated member operatively mounted in said secondary chamber to coöperate in compressing fuel gas therebetween and in exhausting burnt gases from said chamber, and devices for inducting fuel gas into said primary chamber and compressing the same therein, and for permitting the passage of said compressed gas from said primary chamber to said secondary chamber at predetermined periods.

4. A rotary engine including a casing having circular, axially alined and independent primary and secondary chambers formed therein, a shaft axially and revolubly mounted in said chambers, devices operatively mounted on said shaft for compressing and exploding fuel gas in said secondary chamber and for expelling burnt gases therefrom, fixed valve controlled compression chambers in said primary chamber, and a shaft oscillated member operatively mounted to induct fuel gas into said primary chamber and compress the same in said compression chambers, and means for permitting the passage of said compressed gas into said secondary chamber at predetermined periods.

5. A rotary engine including a casing having circular, axially alined and independent primary and secondary chambers formed therein, a shaft axially and revolubly mounted in said chambers, a member fixedly secured to said shaft and an intermittently acting shaft actuated member operatively mounted in said secondary chamber to coöperate in compressing fuel gas therebetween and in exhausting burnt gases from said chamber at predetermined periods, means for compressing and storing fuel gas in said primary chamber and means for permitting the passage of said compressed fuel gas into said secondary chamber from said primary chamber at predetermined periods.

6. A rotary engine including a casing having circular, axially alined and independent primary and secondary chambers formed therein, a shaft axially and revolubly mounted in said chambers, devices operatively mounted on said shaft for compressing and exploding fuel gas in said secondary chamber and for expelling burnt gases therefrom, means for compressing and storing fuel gas in said primary chamber and means for permitting the passage of said compressed fuel gas into said secondary chamber from said primary chamber at predetermined periods.

7. A rotary engine including a casing having circular, axially alined and independent primary and secondary chambers formed therein, a shaft axially and revolubly mounted in said chambers, a member fixedly mounted on said shaft and carrying a pair of oppositely positioned and outwardly and laterally extending blades, a member revolubly mounted on said shaft and carrying a pair of oppositely positioned and outwardly and laterally projecting blades adapted to coöperate with said first mentioned blades to form explosion chambers and to effect the discharge of burnt gases from said chamber, and shaft operated mechanism for advancing said last mentioned blades intermittently at predetermined periods, means for compressing and storing fuel gas in said primary chamber and means for permitting the passage of said compressed fuel gas into said secondary chamber from said primary chamber at predetermined periods.

8. A rotary engine including a casing having circular, axially alined and independent primary and secondary chambers formed therein, a shaft axially and revolubly mounted in said chambers, a member fixedly secured to said shaft and an intermittently acting shaft actuated member operatively mounted in said secondary chamber to coöperate in compressing fuel gas therebetween and in exhausting burnt gases from said chamber at predetermined periods, a shaft oscillated member operatively mounted to induct fuel gas into said primary chamber and compress the same therein, and means for permitting the passage of said compressed gas into said secondary chamber at predetermined periods.

PIETRO ARRIGHI.